(No Model.) 4 Sheets—Sheet 1.

E. SONNTAG.
STEAM ACTUATED VALVE AND EXPANSION GEAR.

No. 270,854. Patented Jan. 16, 1883.

Witnesses.
Inventor.

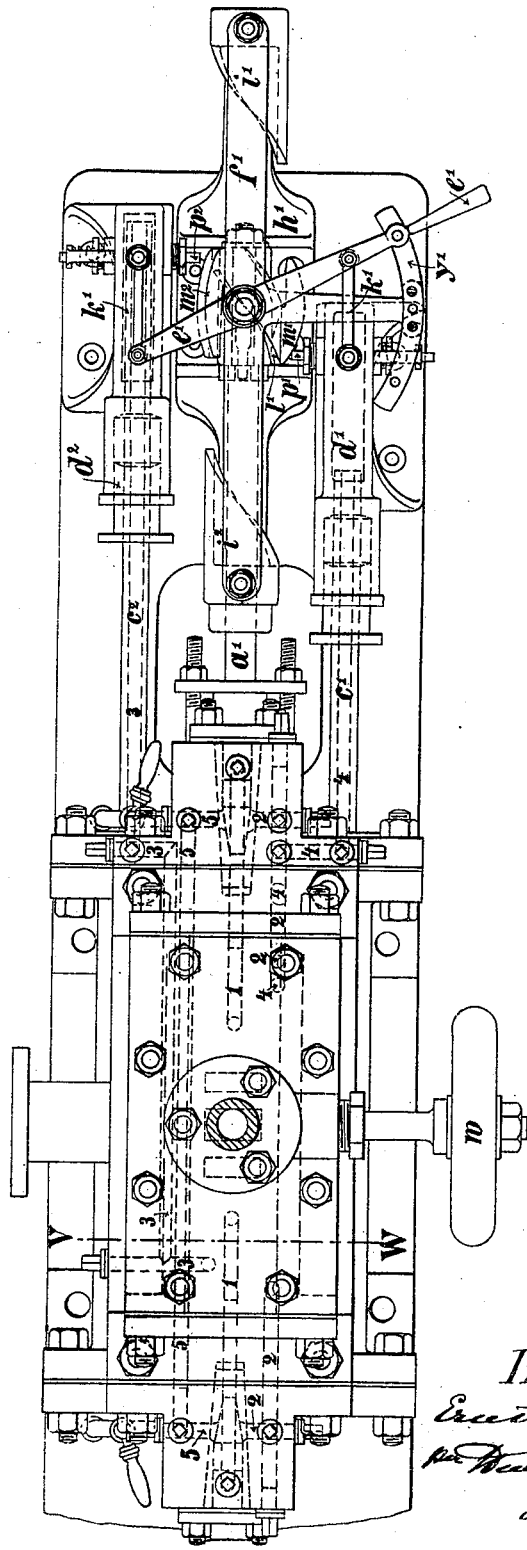

(No Model.) 4 Sheets—Sheet 3.
E. SONNTAG.
STEAM ACTUATED VALVE AND EXPANSION GEAR.
No. 270,854. Patented Jan. 16, 1883.
Fig. 6.
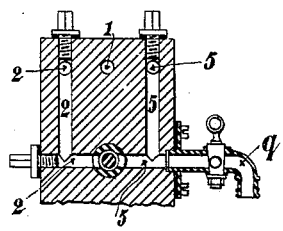
Fig. 3.
Fig. 5.
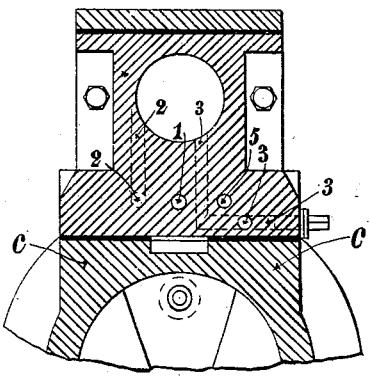
Fig. 8.
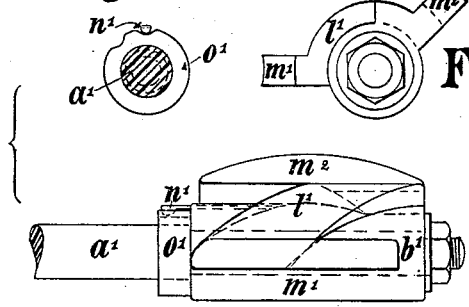
Fig. 7.
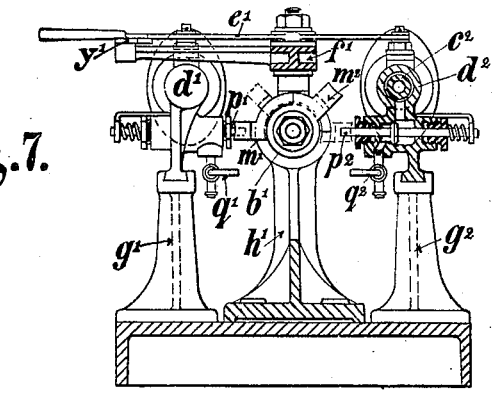
Fig. 4.
Witnesses.
John F. Allen
Richard F. Nagle
Inventor.
Ernst Sonntag
per Deery & Kueder
attorney (No Model.) 4 Sheets—Sheet 4.

E. SONNTAG.
STEAM ACTUATED VALVE AND EXPANSION GEAR.

No. 270,854. Patented Jan. 16, 1883.

Witnesses.
John F. Allen
Richard F. Nagle.

Inventor.
Ernst Sonntag
per Deery & Stender
Attorney.

UNITED STATES PATENT OFFICE.

ERNST SONNTAG, OF LAUBAN, PRUSSIA, GERMANY.

STEAM-ACTUATED VALVE AND EXPANSION-GEAR.

SPECIFICATION forming part of Letters Patent No. 270,854, dated January 16, 1883.

Application filed May 16, 1882. (No model.) Patented in Germany June 14, 1881, No. 16,842; in Belgium November 23, 1881, No. 56,304; in Italy December 31, 1881, XV, 13,633, and in Denmark March 15, 1882, No. 2,587.

*To all whom it may concern:*

Be it known that I, ERNST SONNTAG, a subject of the Emperor of Germany and King of Prussia, and resident of Lauban, in the Kingdom of Prussia, have invented a new and useful Improvement in Steam-Actuated Valves and Expansion-Gears, (for which I have obtained a patent in Germany, No. 16,842, bearing date June 14, 1881; in Denmark, No. 2,587, 1881, bearing date March 15, 1882; in Italy, No. 13,633, Vol. 15, bearing date December 31, 1881; in Belgium, No. 56,304, B, bearing date November 23, 1881,) of which the following is a specification.

My invention relates to improvements in steam-motors in which the distributing-valve is actuated directly by the steam; and the objects of my improvements are, first, to arrange the steam ducts and valves in such manner that the motor operates in the most regular way; and, second, to adapt an expansion-gear to the aforesaid motor. I attain these objects by the mechanism illustrated in the accompanying four sheets of drawings, in which—

Figure 1:
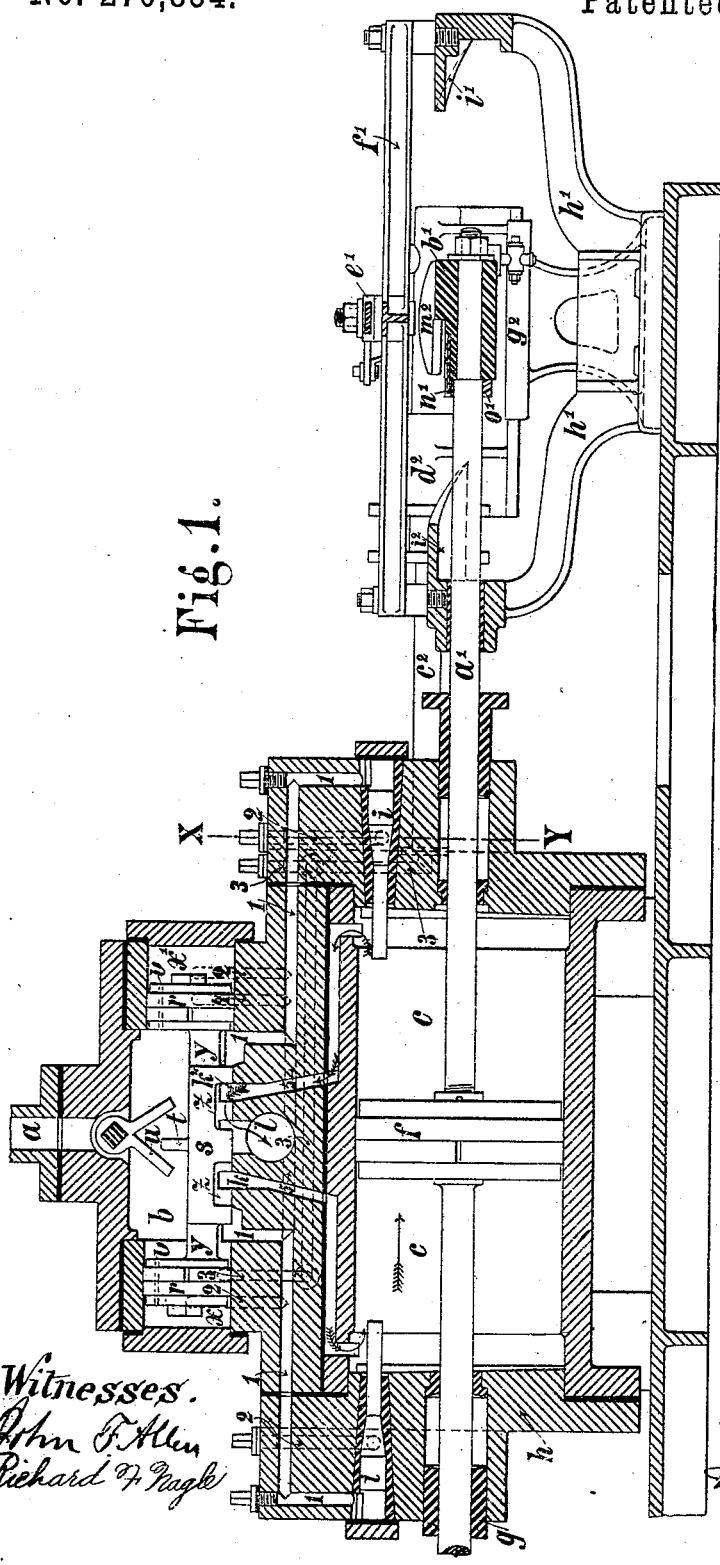
Figure 9:
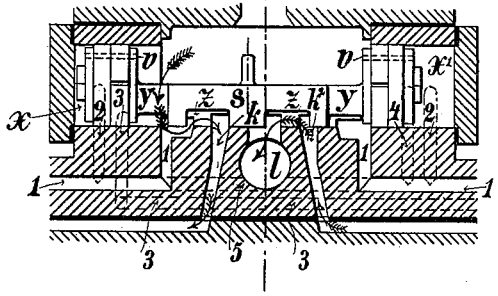
Figure 10:
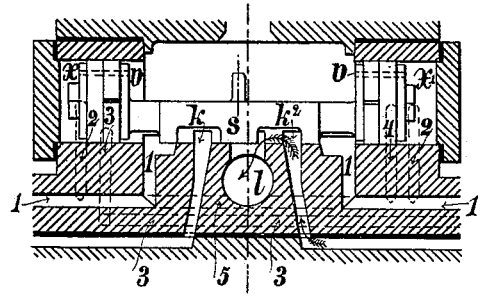
Figure 11:
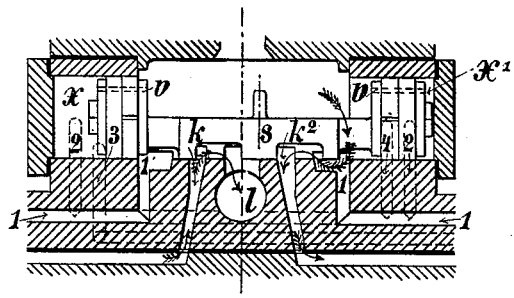
Figure 12:
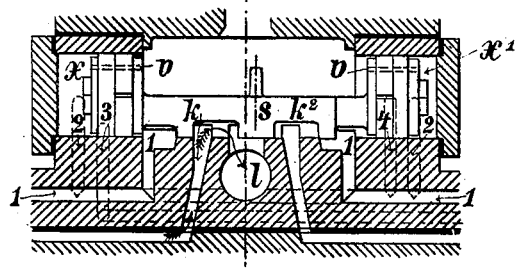

Figure 1 is a longitudinal section of the entire machine; Fig. 2, a top view, and Fig. 3 a vertical section, of the machine. Fig. 4 is an end view of the expansion-gear; Fig. 5, a section upon the line V W, Fig. 2; Fig. 6, a section upon the line X Y, Fig. 1. Figs. 7 and 8 are detailed views of a detached part of the machine. In Figs. 9 to 12 the different positions of the slide-valve are shown.

Similar letters refer to similar parts throughout the several views.

The steam enters through the pipe $a$ into the valve-chest $b$. The steam-piston $f$ slides in the cylinder $c$. The cylinder-heads $h$ have re-enforcements for receiving the several steam-passages referred to hereinafter. The steam-distributing ports $k$ and $k^2$, leading from the steam-chest to the cylinder, are arranged in the usual manner. There are, moreover, the following steam-passages bored in the cylinder $c$: first, the passages 1 1, leading from the steam-chest $b$ to the head-faces of the conical valves $i\ i$; second, the passages 2 2, leading from the steam-chest to the conical seats of the valves $i\ i$; third, the passages 5 5, leading from the seats of the valves $i\ i$ to the steam-exhaust port $l$; fourth, the passage 3, leading from the steam-chest to the expansion-valve $p^2$, referred to hereinafter; fifth, the passage 4, leading from the steam-chest to the other expansion-valve, $p'$.

The slide-valve is formed by two pistons, $r\ r$, united together by the semi-cylindrical connecting-piece $s$. This latter is provided with two annular recesses, $y\ y$, and two cavities, $z\ z$, and the two pistons $r\ r$ have two very small holes, $v\ v$. By means of the hand-wheel $w$, the fork $u$, and the tappet $t$, fixed to the piece $s$, the slide-valve may also occasionally be moved by hand.

The distribution of steam and the expansion are operated as follows: In the position of the slide-valve shown in Fig. 9 the steam enters the port $k$, the piston $f$ is going from left to right, and the steam escapes through the port $k^2$. If, now, by means of a device explained hereinafter, the expansion-valve $p'$ is opened, the compartment $x'$ of the steam-chest communicates by the passage 4 with the outer air. There is therefore necessarily a rarefaction produced in the compartment $x'$, and the slide-valve $r\ r$ will advance till it covers the passage 4, and by so doing occupy now the position shown in Fig. 10. In this position no further steam is admitted to the port $k$, and the steam at the left side of the piston will therefore expand. At the end of its stroke the piston $f$ raises the valve $i$ out of its seat, into which it is constantly pressed by the steam entering through the passage 1. As soon as the valve $i$ is raised out of its seat the passage 2 comes in communication with the passage 5, leading to the exhaust-port $l$, and therefore a second time a rarefaction is produced in the compartment $x'$ of the steam-chest, and the slide-valve advances till it covers the passage 2 at right hand and occupies the position shown in Fig. 11. The steam enters the port $k^2$, and by this means the piston $f$ is reversed. During the back motion of the piston the expansion-valve $p^2$, communicating with the passage 3, is opened, a rarefaction is effected in the compartment $x$ of the steam-chest, and the slide-valve advances from right to left till it covers the passage 3. In this position, Fig. 12, the expansion begins, which is terminated when the steam-piston pushes back the left valve, $i$, and, in the manner already described, the slide-valve advances till it covers the passage 2, so occupying again the first position shown in Fig. 9. Through the small holes $v\ v$ of the slide-valve $r\ r$ always a little quantity of steam is admitted to the compartments $x$ and $x'$, and therefore the slide-valve will advance against the rarefied compartments more gradually and without any shock.

The two expansion-valves $p'$ and $p^2$ are opened and closed by the following mechanism: The passage 4 communicates with the pipe $c'$, screwed to the cylinder-head, and over the pipe $c'$ slides another pipe, $d'$, at the end of which the valve $p'$ is arranged. The prism secured to the bottom of the pipe $d'$, Fig. 4, slides in a guide of the standard $g'$. The parts $c^2\ d^2\ p^2\ g^2$ are, as to construction and operation, perfectly correspondent to the parts $c'\ d'\ p'\ g'$.

The outer end of the piston-rod $a'$ carries the socket $b'$, turning freely round the piston-rod, and provided with two semi-lunary ribs, $m'\ m^2$, and, moreover, surrounded by a short square-threaded piece, $l'$. The two arms of the standard $h'$, which latter, by one of these arms, guides the piston-rod $a'$, carry the two triangles $i'\ i^2$, the helicoidal edges of which are evident from the top view of the machine, Fig. 2. According to the reciprocating motion of the piston-rod, the helicoidal edges of the thread $l'$ will push against the helicoidal edges of the triangles $i'$ and $i^2$, and in this way the socket $b'$ will alternatively be turned round the piston-rod $a'$ from the position shown in Fig. 4 into the other position, represented by dotted lines in the same figure, or vice versa. If the socket $b'$ during the outstroke of the piston occupies the position shown in Fig. 4, the rib $m'$ will catch the projecting center-pin of the valve $p'$ and press the latter out of its seat, which it then retakes by pression of a spiral spring. The other rib, $m^2$, passes by the pin of the valve $p^2$; but during the instroke of the piston the rib $m^2$ catches the valve $p^2$, and the rib $m'$ does not touch the valve $p'$. In order that the socket $b'$ at the end of each stroke may be maintained more steadily in one or other position, the spring $n'$, Fig. 8, fixed to $b'$, catches into one or other of the two notches of the ring $o'$ of the piston-rod. The lever $e'$, pivoting on the cross-piece $f'$, secured to the standard $h'$, serves to determine the degree of the expansion. For this purpose the ends of the lever $e'$ are united by the links $k'$ to the sliding pipes $d'\ d^2$, which contain the valves $p'$ and $p^2$. If, now, the lever $e'$ is brought in any distinct position on the quadrant $y'$, the valves $p'$ and $p^2$ will also be opened at a distinct point of the course of the piston, and therefore the degree of the expansion will be determined.

The motor works also as an ordinary steam-pump without expansion, if the outlet-cocks $q'\ q^2$ of the valves $p'\ p^2$ are closed, or if the socket $b'$ is detached.

I am aware that prior to my invention steam-motors in which the distributing-valve is actuated directly by the steam have been made. I therefore do not claim such an arrangement, broadly; but What I do claim as my invention, and desire to secure by Letters Patent, is—

1. The combination, with the steam-actuated valve, of the valves $i\ i$, passage 1, leading from the steam-chest to the head-face of said valves, passage 2, leading from the steam-chest to the seats of said valves, and passage 5, leading from the seats of said valves to the steam-exhaust port, slide-valve $r$, having holes $v$ and sliding in the steam-chest $b$, and the compartments $x\ x'$, which communicate with the seats of said valves $i$, and also with the outer air, substantially as set forth.

2. The combination, with the steam-actuated valve, of the conical valves $i\ i$, passage 1, leading from the steam-chest to the head-face of said valves, passage 2, leading from the steam-chest to the conical seats of said valves, and passage 5, leading from the seats of said valves to the steam-exhaust port $l$, slide-valve $r$, having holes $v$, and sliding in the steam-chest $b$, the compartments $x\ x'$, which communicate with the seats of said valves $i$ and also with the outer air, the expansion-valves $p'\ p^2$, and the passages 3 and 4, which lead from the steam-chest to said expansion-valves, substantially as set forth.

3. In a steam-motor with steam-actuated valves, the combination of the steam-passages 3 and 4, pipes $c'\ c^2$, movable pipes $d'\ d^2$, sliding over the pipes $c'\ c^2$, valves $p'\ p^2$, attached to the pipes $d'\ d^2$, the socket $b'$, turning on the piston-rod, and provided with semi-lunary ribs $m'\ m^2$ and square-threaded piece $l'$, the stationary triangles $i'\ i^2$, with helicoidal edges, and the pivoted lever $e'$, connected through links $k'\ k'$ with the pipes $d'\ d^2$, arranged to operate in combination with the compartments $x\ x'$ of the steam-chest, substantially in the manner and for the purpose herein described.

ERNST SONNTAG.

Witnesses:
HENRY E. ROEDER,
RICHARD F. NAGLE.